(12) United States Patent
Terwilliger et al.

(10) Patent No.: US 11,015,523 B2
(45) Date of Patent: May 25, 2021

(54) TURBOFAN WITH BLEED SUPERCHARGED AUXILIARY ENGINE

(71) Applicant: United Technologies Corporation, Farmington, CT (US)

(72) Inventors: Neil Terwilliger, Meriden, CT (US); Daniel Bernard Kupratis, Wallingford, CT (US); Christopher J. Hanlon, Sturbridge, MA (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 16/431,259

(22) Filed: Jun. 4, 2019

(65) Prior Publication Data
US 2019/0368417 A1     Dec. 5, 2019

Related U.S. Application Data

(60) Provisional application No. 62/680,843, filed on Jun. 5, 2018.

(51) Int. Cl.

| | |
|---|---|
| *F02C 6/08* | (2006.01) |
| *F02C 6/02* | (2006.01) |
| *F02C 9/18* | (2006.01) |
| *F02C 7/143* | (2006.01) |
| *F02C 7/36* | (2006.01) |
| *F02C 3/04* | (2006.01) |

(52) U.S. Cl.
CPC .............. *F02C 6/08* (2013.01); *F02C 3/04* (2013.01); *F02C 6/02* (2013.01); *F02C 7/143* (2013.01); *F02C 7/36* (2013.01); *F02C 9/18* (2013.01); *F05D 2220/323* (2013.01); *F05D 2220/50* (2013.01); *F05D 2220/76* (2013.01); *F05D 2270/13* (2013.01)

(58) Field of Classification Search
CPC ...... F02C 6/02; F02C 6/08; F02C 7/36; F02C 9/18
See application file for complete search history.

(56) References Cited

U.S. PATENT DOCUMENTS

| | | | |
|---|---|---|---|
| 3,965,673 | A | 6/1976 | Friedrich |
| 4,541,237 | A | 9/1985 | Dickey |
| 6,305,156 | B1 * | 10/2001 | Lui ........................ B64D 13/06 60/785 |
| 6,971,241 | B2 | 12/2005 | Critchley et al. |
| 8,205,429 | B2 | 6/2012 | Wollenweber |
| 9,099,882 | B2 | 8/2015 | Lammers et al. |
| 9,410,478 | B2 | 8/2016 | Loebig et al. |
| 9,429,077 | B2 | 8/2016 | Morgan |

(Continued)

*Primary Examiner* — Steven M Sutherland
(74) *Attorney, Agent, or Firm* — Kinney & Lange, P.A.

(57) ABSTRACT

An aircraft gas turbine engine system comprises first and second gas turbine engines connected by an inter-engine gas path. The first gas turbine engine has a first spool with a first compressor section, and a second spool with a second compressor section downstream of and rotationally independent from the first compressor section. The second gas turbine engine is configured to provide power to at least one of the first and second spools of the first gas turbine engine. The inter-engine gas path is disposed to receive gas flow bled from a bleed location in the first gas turbine engine downstream of the first compressor section, and to supply this gas flow to an inlet of the second gas turbine engine.

19 Claims, 2 Drawing Sheets

(56) References Cited

U.S. PATENT DOCUMENTS

| | | | |
|---|---|---|---|
| 2004/0191058 A1* | 9/2004 | Baumann | F04D 29/545 |
| | | | 415/144 |
| 2005/0210863 A1* | 9/2005 | Wollenweber | F02C 6/08 |
| | | | 60/224 |
| 2012/0119020 A1* | 5/2012 | Burns | B64D 35/00 |
| | | | 244/58 |
| 2017/0226934 A1 | 8/2017 | Robic et al. | |
| 2018/0003072 A1 | 1/2018 | Lents et al. | |

\* cited by examiner

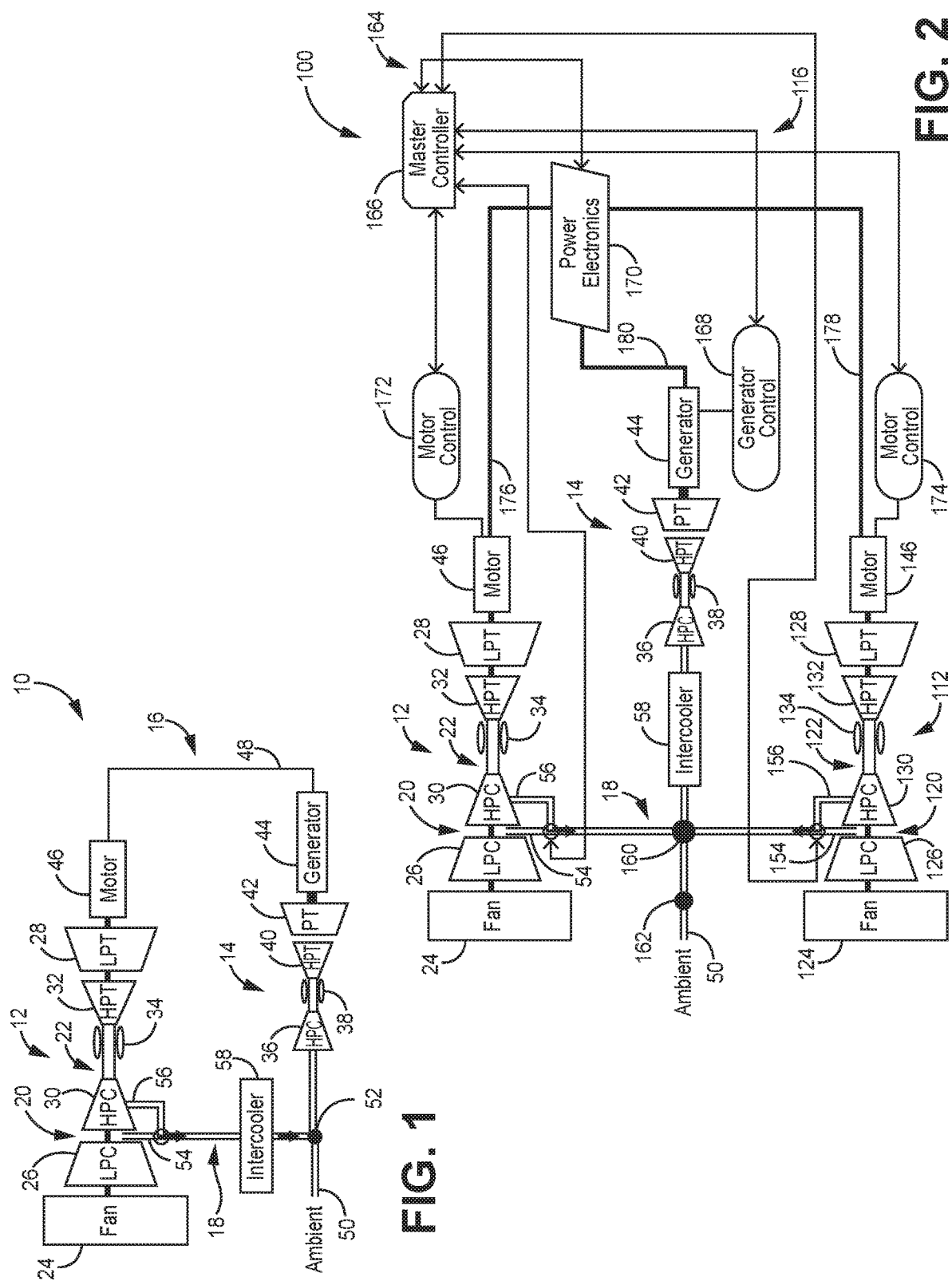

TURBOFAN WITH BLEED SUPERCHARGED AUXILIARY ENGINE

CROSS-REFERENCE TO RELATED APPLICATION(S)

This application claims the benefit of U.S. Provisional Application No. 62/680,843 filed Jun. 5, 2018 for "Turbofan with Bleed Supercharged Auxiliary Engine" by N. Terwilliger, D. Kupratis, and C. Hanlon, which is herein incorporated by reference. U.S. Provisional Application Nos. 62/686,853 and 62/719,375, filed Aug. 17, 2018 and Jun. 19, 2018, respectively, are also incorporated by reference.

BACKGROUND

The present disclosure relates generally to multiple engine gas turbine systems, and more particularly to a system whereby a secondary engine provides boost power to a primary engine low spool, while excess gas flow is diverted from the primary engine to supercharge the secondary engine.

Multi-spool gas turbine engines include successive stages of compressors and turbines in flow series. It is possible to boost a multi-spool engine by driving one or more spools of the engine using external power, i.e. external to the engine's own Brayton cycle. A boost to low pressure compressor (LPC) power, however, can produce LPC output airflow exceeding a maximum intake of the downstream high pressure compressor (HPC), which can cause stall. Stall, for this reason, poses an impediment to boosting low spool power using an external source.

SUMMARY

In one embodiment, the present disclosure is directed to an aircraft gas turbine engine system that comprises first and second gas turbine engines connected by an inter-engine gas path. The first gas turbine engine has a first spool with a first compressor section, and a second spool with a second compressor section downstream of and rotationally independent from the first compressor section. The second gas turbine engine is configured to provide power to at least one of the first and second spools of the first gas turbine engine. The inter-engine gas path is disposed to receive gas flow bled from a bleed location in the first gas turbine engine downstream of the first compressor section, and to supply this gas flow to an inlet of the second gas turbine engine.

In another embodiment, the present disclosure is directed to a method of operating a system of at least two gas turbine engines. The first engine includes a first spool with a first compressor, and a second spool with a second compressor downstream from and rotationally independent of the first compressor. The method involves boosting a first spool using a second engine, thereby producing an increase in flow volume from the first compressor at an interface with the adjacent second compressor. A pressurized inter-engine compressor airflow is bled from the first engine, downstream of the first compressor; and supplied to an intake of the second engine, thereby supercharging the second engine and alleviating potential overpressure.

The present summary is provided only by way of example, and not limitation. Other aspects of the present disclosure will be appreciated in view of the entirety of the present disclosure, including the entire text, claims, and accompanying figures.

BRIEF DESCRIPTION OF THE DRAWINGS

FIG. 1 is a schematic diagram of a multi-engine system including a primary engine boosted by a bleed supercharged auxiliary engine.

FIG. 2 is a schematic diagram of another multi-engine system including multiple primary engines boosted by a bleed supercharged auxiliary engine.

Figure 3:
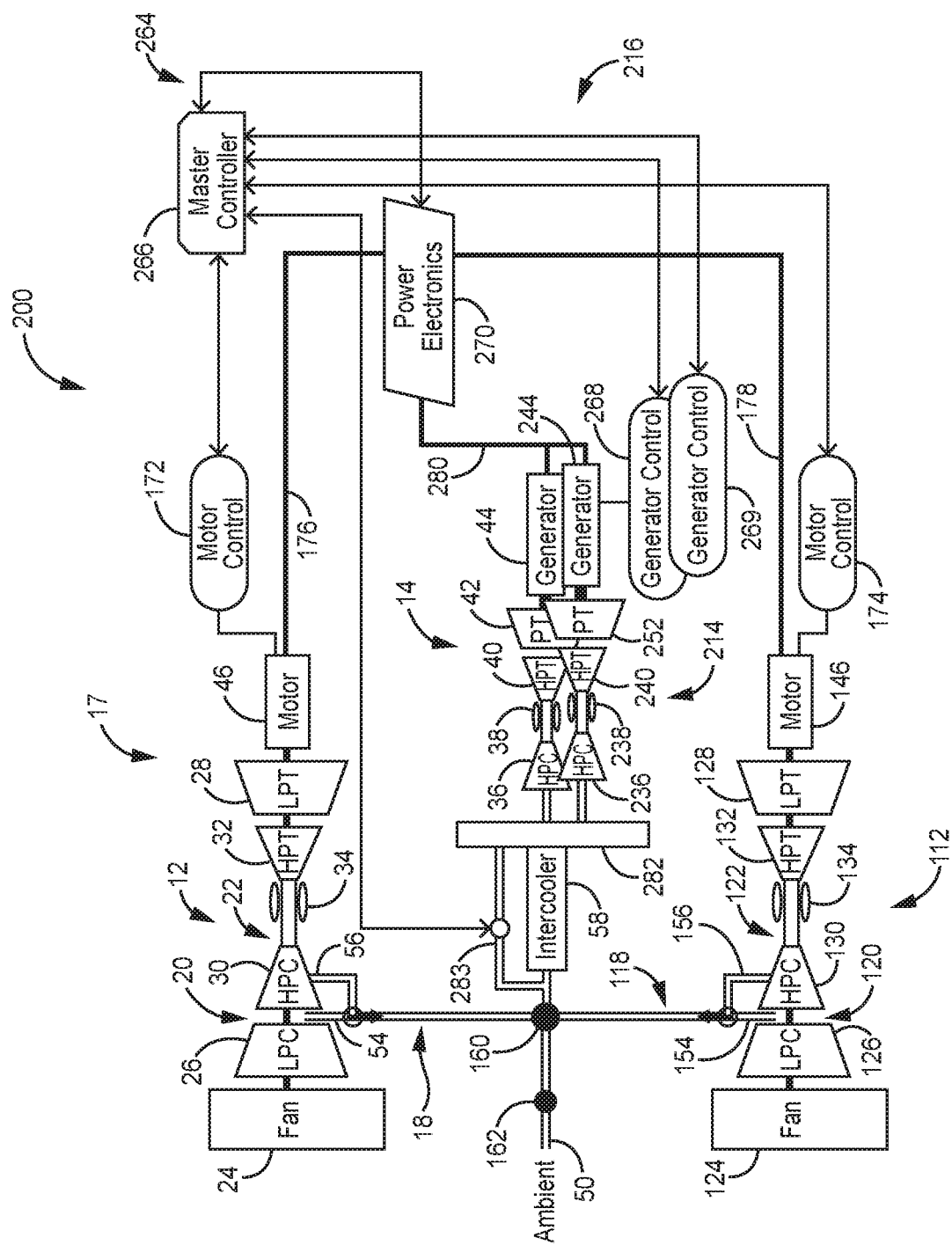
FIG. 3 is a schematic diagram of yet another multi-engine system including multiple primary engines boosted by multiple bleed supercharged auxiliary engines.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

The present disclosure presents systems of interconnected gas turbine engines. In the simplest of these systems, a primary multi-spool engine has a low-pressure spool boosted by a secondary engine via a power linkage. While the secondary engine boosts the low-pressure spool of the primary engine, airflow output from a low-pressure compressor can exceed maximum intake of the downstream high-pressure compressor of the primary engine. This excess airflow is bled downstream of the low-pressure compressor via an inter-engine gas path to an inlet of the secondary engine, thereby avoiding potential stall conditions in the primary engine while simultaneously supercharging the secondary engine with pre-pressurized air.

FIG. 1 is a schematic diagram of a multi-engine system 10, which includes primary engine 12 and secondary engine 14. Primary and secondary engines 12 and 14 are gas turbine engines. In some embodiments, primary engine 12 can be an aircraft propulsion engine, and secondary engine 14 can be an aircraft auxiliary power unit (APU). In alternative embodiments, primary engine 12 and secondary engine 14 can both be propulsion engines. Primary engine 12 and secondary engine 14 are interconnected by power linkage 16 and inter-engine airflow channel 18.

In the illustrated embodiment, primary engine 12 is a two-spool engine having a low spool 20 and a high spool 22. More generally, however, the present disclosure is relevant to any primary engine 12 with at least two spools. Low spool 20 carries fan 24, low pressure compressor (LPC) 26, and low pressure turbine (LPT) 28. High spool 22 carries high pressure compressor (HPC) 30 (immediately downstream of LPC 26) and high pressure turbine (HPT) 32 (upstream of LPT 28). Primary engine 12 is a Brayton cycle engine wherein a mixture of fuel with compressed air through LPC 26 and HPC 30 is ignited in combustor 34, thereby driving HPT 32 and LPT 28, as generally understood in the art.

Like primary engine 12, secondary engine 14 is a gas turbine engine. In the illustrated embodiment, secondary engine 14 includes HPC 36, combustor 38, HPT 40, and power turbine (PT) 42. Although secondary engine 14 is depicted as a single-spool engine, alternative embodiments can include multiple spools. Similarly, although secondary engine 14 is shown with PT 42 separate from HPT 40, some embodiments of secondary engine 14 can include only a single turbine section. Secondary engine 14 can provide power to a range of peripheral aircraft functions independent from propulsion or from the operation of primary engine 12. For example, secondary engine 14 can be used for power generation, for cabin air circulation, and/or to drive mechanical actuation of aircraft components.

Primary engine 12 and secondary engine 14 are connected by power linkage 16, which includes generator 44, motor 46, and electrical connection 48. Generator 44 is a rotary electrical generator driven by secondary engine 14. Although generator 44 is depicted as situated axially adjacent PT 42, generator 44 can more generally have any form capable of producing electrical power from secondary engine 14. Generator 44 can, for example, be driven from secondary engine by an intervening gearbox, or can be integrated into a structure or case of secondary engine 14. Electrical connection 48 connects generator 44 to motor 46, which is disposed to drive (i.e. boost) at least one spool of primary engine 12. In the illustrated embodiment, a single motor 46 is disposed on low spool 20. More generally, however, single or multiple electrical motors can receive power from generator 44 to drive any number of spools of primary engine 12. Although power linkage 16 is described herein primarily as an electrical linkage, spools of primary engine 12 and secondary engine 14 can alternatively or additionally be connected by mechanical linkages. While secondary engine 14 is active, power linkage 16 permits power from secondary engine 14 to boost spools of primary engine 12, particularly low spool 20.

Boosting low spool 20 increases exit pressure and output throughput of LPC 26, such that the output airflow of LPC 26 can exceed a maximum airflow intake of adjacent HPC 30. Inter-engine gas path 18 diverts a portion of the primary pressurized airflow downstream of LPC 26 to an inlet of secondary engine 14, thereby simultaneously supercharging secondary engine 14 and alleviating potential overpressure at the intersection of LPC 26 and HPC 30. Inter-engine gas path 18 thereby avoids stall conditions in primary engine 12, and improves operating efficiency of secondary engine 14 by supplying it with pre-pressurized air. Inter-engine gas path 18 can receive bleed air from primary engine 12 at a range of bleed locations, either alternatively or cumulatively, including at inter-compressor bleed 54 and HPC bleed 56. Inter-compressor bleed 54 diverts a portion of the output airflow of LPC 26 to inter-engine gas path 18 before it can enter HPC 30. HPC bleed 56 can, for example, supplement inter-compressor bleed 54 to further redirect airflow within HPC 30 to prevent a mismatch of LPC 26 output airflow and HPC 30 throughput capacity. In the illustrated embodiment, intercooler 58 is disposed along inter-engine gas path 18 to cool hot air bled form primary engine 12 before supplying that bleed air to secondary engine 14. Although embodiments illustrated herein show intercoolers, these intercoolers can be omitted where temperature tolerances for secondary engine compressor and inlet sections (e.g. HPC 36 of secondary engine 14) permit direct acceptance of hot bleed air.

While primary engine 12 is not running, no bleed air is generally available through inter-engine gas path 18. Accordingly, secondary engine 14 can be connected to ambient air source 50 via switch 52. Ambient air source 50 can, for example, be an environmental air intake, and switch 52 a switching valve disposed to toggle between ambient air source 50 and inter-engine gas path 18 as gas inputs of secondary engine 14. In the illustrated embodiment, either ambient air source 50 or inter-engine gas path 18 will supply entirety of the input air of secondary engine 14—these sources are not combined. Bleed of pressurized air from bleed locations 54, 56 can be metered, either as a dedicated bleed flow for secondary engine 14, or together with engine bleed air for other purposes (e.g. for cabin airflow), with accompanying bleed control hardware.

The arrangement described above supercharges secondary engine 14 with bleed air from primary engine 12, while boosting low spool 20 of primary engine 12 and addressing the possibility of overpressure between LPC 26 and HPC 30 that could otherwise result in LPC stall.

FIGS. 2 and 3 illustrate alternative or additional embodiments of multi-engine systems similar to the multi-engine system 10. FIG. 2 depicts multi-engine system 100, which includes a second primary engine 112 operating substantially in parallel with primary engine 12. FIG. 3 depicts multi-engine system 200, which extends multi-engine system 100 with an additional secondary engine 214.

Multi-engine systems 100 and 200 include primary engines 12 and 112, both of which operate substantially as described above with respect to multi-engine system 10 and FIG. 1. Components of primary engine 112 generally parallel similarly-numbered components of primary engine 12 (e.g. HPC 30 parallels HPC 130, combustor 34 parallels combustor 134). Multi-engine system 200 includes secondary engines 14 and 214, both of which operate substantially as described above with respect to multi-engine system 10, and as described hereinafter with respect to multi-engine system 100. Components of secondary engine 214 also generally parallel similarly-numbered components of secondary engine 14 (e.g. HPC 36 parallels HPC 236, PT 42 parallels PT 242).

Multi-engine system 100 includes a secondary engine 14 that provides power to and receives pre-pressurized airflow from both primary engines 12, 112. In the illustrated embodiment, separate inter-engine gas paths 18 and 118 carry bleed air from primary engines 12, 112, and meet at mix location 160. Mix location 160 can, for example, be a metering valve that accepts airflow from different engines at controlled rates or proportions, or a one-way valve that freely receives airflow from either inter-engine gas path 18, 118, but does not permit backflow from either inter-engine gas path into the other. In the illustrated embodiment, multi-engine system 100 also includes a check valve 162 disposed between mix location 160 and ambient air source 50. In other embodiments, check valve 162 can be incorporated into valving at mix location 160. In at least some embodiments, a single intercooler 58 disposed between mix location 160 and secondary engine 14 can cool gas flow from either or both inter-engine gas paths; separate intercoolers are not needed for each primary engine. Power linkage 116 operates similarly to power linkage 16, but connects generator 44 both with motor 46 of primary engine 12 and with similar motor 146 of primary engine 112. Power linkage 116 is described in greater detail hereinafter together with accompanying control systems.

Multi-engine system 200 operates substantially as described above with respect to system 100, but includes an additional secondary engine 214. Although two primary engines 12, 112 and two secondary engines 14, 214 are depicted, the principles disclosed herein can be applied to systems of any number of interconnected primary and secondary engines. As depicted in FIG. 3, each secondary engine 14, 214 drives a corresponding generator 44, 244. In some embodiments, each secondary engine 14, 214 boosts only a single primary engine 12, 112. In more flexible embodiments, however, power produced by generators 44, 244 can be distributed freely via power linkage 216 between primary engines 12, 112, as needed. Multi-engine system 200 closely parallels multi-engine system 100, but further includes splitter chamber 282, which in the depicted embodiment splits cooled air from intercooler 58 between inlets of secondary engines 14, 214. Splitter chamber 282 can be an open plenum connecting both secondary engines 14, 214 to the incoming gas path, or can be a metering chamber capable of proportioning air between engines in a controlled fashion.

FIGS. 2 and 3 illustrate control system 164 and 264, respectively. Control systems 164 and 264 include motor controllers 172 and 174 coupled with motors 46 and 146, respectively. Control systems 164 and 264 additionally include generator controllers 168 and 268/269, respectively. Generator controller 168 controls generator 44, while generator controllers 268 and 269 control generator 44 and generator 244, respectively. All of these control systems are governed by master controller 166/266. In addition, master controllers 166, 266 can communicate with conventional engine control devices such as full authority digital engine controllers (FADECs) for each engine 12, 112, 14, 214. Master controllers 166, 266 coordinate power generation, motor, and engine operation across all generators, motors, and engines in systems 100 and 200, respectively. This includes control over power electronics 170 or 270, which receive, condition, and route power from generators 44 or 44 and 244, to motors 46 and/or 146. In the illustrated embodiments, electrical connections 176 and 178 connect power electronics 170/270 with motors 46 and 146, respectively. Electrical connections 180 and 280 supply power from generators 44 or 44 and 244 to power electronics 170 or 270. Electrical connection 280 can be a common electrical connection shared by both generators 44, 244, or combination of separate electrical connections for each generator. Master controller 166/266 can additionally set bleed rates from bleed locations 54, 56, 154, and 156, e.g. through control of bleed valves at or downstream of bleed locations 54, 56, 154, and 156, as illustrated in FIG. 2. FIG. 3 additionally depicts bypass line 283, which can be present in some embodiments to route fluid from mix location 160 past intercooler 58 to splitter chamber 282. This bypass can be governed by master controller 266, e.g. via valves on or adjacent bypass line 283, as shown.

By coordinating control of power electronics, motors, generators, bleed valves, and engines (e.g. including vane actuation and fuel metering), master controller 166/266 can reallocate both power and airflow between engines as needed to compensate for differences between engines, including manufacturing differences, differences due to engine deterioration or age, and differences due to unexpected failures. Engine 12 can differ from engine 112, and engine 14 can differ from engine 214. Multi-engine systems 100 and 200 allow compensation for these differences beyond what is possible through the isolated control of separate engines.

Multi-engine system 10 introduces a system whereby gas flow and power are shared across multiple engines to increase primary engine power, improve secondary engine efficiency, and avoid primary engine overpressure or stall conditions. Multi-engine systems 100 and 200 expand on system 10 by introducing additional primary and secondary engines 112, 214, which can also share airflow and power, as described above. These architectures permit flexible responses to engine differences, in addition to the benefits of system 10.

Discussion of Possible Embodiments

The following are non-exclusive descriptions of possible embodiments of the present invention.

An aircraft gas turbine engine system comprising: a first gas turbine engine comprising a first spool with a first compressor section, and a second spool with a second compressor section downstream of and rotationally independent from the first compressor section; a second gas turbine engine configured to provide power to at least one of the first and second spools of the first gas turbine engine; and an inter-engine gas path disposed to receive gas flow bled from a bleed location in the first gas turbine engine downstream of the first compressor section, and to supply this gas flow to an inlet of the second gas turbine engine.

The system of the preceding paragraph can optionally include, additionally and/or alternatively, any one or more of the following features, configurations and/or additional components:

A further embodiment of the foregoing system, further comprising: a generator connected to the second gas turbine engine, and disposed to be powered by the second gas turbine engine; and a motor disposed to boost at least one of the first and second spools, and powered by the generator; wherein providing power to at least one of the first and second spools of the main gas turbine engine comprises powering the generator to drive the motor.

A further embodiment of the foregoing system, wherein the first gas turbine engine is a propulsion engine, and the second gas turbine engine is an auxiliary power unit (APU).

A further embodiment of the foregoing system, further comprising an intercooler disposed along the inter-engine gas path so as to cool the gas flow, thereby supplying the gas flow to the inlet of the second gas turbine engine at a lower temperature than bled from the bleed location.

A further embodiment of the foregoing system, wherein the bleed location is situated between the first compressor section and the second compressor section.

A further embodiment of the foregoing system, wherein the bleed location is situated in the second compressor section.

A further embodiment of the foregoing system, wherein the bleed location extends downstream from between the first compressor section and the second compressor section, and encompasses a plurality of bleed outlets from compressor regions of the first gas turbine engine.

A further embodiment of the foregoing system, further comprising a linkage coupling the second gas turbine engine to the first spool of the first gas turbine engine.

A further embodiment of the foregoing system, wherein power provided to the first spool from the second gas turbine engine would create an overpressure at the intersection of the first and second compressor sections, but for the gas flow bled from the bleed location.

A further embodiment of the foregoing system, wherein power provided to the first spool from the second gas turbine engine exceeds power provided to the second spool from the second gas turbine engine.

A further embodiment of the foregoing system, wherein the gas flow bled from the bleed location is metered.

A further embodiment of the foregoing system, further comprising: a third gas turbine engine comprising a third spool with a third compressor section, and a fourth spool with a fourth compressor section downstream of and rotationally independent from the third compressor section; and a secondary inter-engine gas path disposed to receive gas flow bleed from a third engine bleed location in the third gas turbine engine downstream of the third compressor section, and to supply this gas flow to the inlet of the second gas turbine engine, wherein the second gas turbine engine additionally provides power to at least one of the third or fourth spools.

A further embodiment of the foregoing system, further comprising a mixing valve disposed upstream of the inlet of the second gas turbine engine, to receive fluid from both the inter-engine gas path and the secondary inter-engine gas path.

A further embodiment of the foregoing system, further comprising an intercooler disposed between the mixing valve and the inlet of the second engine.

A further embodiment of the foregoing system, further comprising a switch valve disposed at the inlet of the second engine, and toggleable between two states: an inter-engine state fluidly connecting the inter-engine gas path to the inlet of the second engine; and an external state fluidly disconnecting the inter-engine gas path from the inlet of the second engine, and opening the inlet of the second engine to an ambient air source.

A method of operating a system of gas turbine engines including a first engine and a second engine, the method comprising: boosting a first spool of the first engine using the second engine, thereby producing an overpressure between a first compressor on the first spool and an adjacent second compressor on a second spool of the first engine rotationally independent from and axially downstream of the first compressor; bleeding a pressurized inter-engine airflow from the first engine, downstream of the first compressor; and supplying the pressurized inter-engine airflow to an intake of the second engine, thereby supercharging the second engine.

The method of the preceding paragraph can optionally include, additionally and/or alternatively, any one or more of the following features, configurations and/or additional components:

A further embodiment of the foregoing method, wherein the bleed from the first engine alleviates the overpressure sufficiently to offset the possibility of stall due to the boosting of the first spool.

A further embodiment of the foregoing method, further comprising cooling the pressurized inter-engine airflow before supplying the pressurized inter-engine airflow to the intake of the second engine.

A further embodiment of the foregoing method, wherein boosting the first spool of the first engine comprises: driving an electrical generator with the second engine; powering a motor from the electrical generator; and driving the first spool using the motor.

An aircraft gas turbine engine system comprising: a first gas turbine engine comprising a first spool with a first compressor section, and a second spool with a second compressor section downstream of and rotationally independent from the first compressor section; means to provide power to at least one of the first and second spools of the first gas turbine engine; and an inter-engine gas path disposed to receive gas flow bled from a bleed location in the first gas turbine engine downstream of the first compressor section, and to supply this gas flow to an inlet of the means to provide power.

The system of the preceding paragraph can optionally include, additionally and/or alternatively, any one or more of the following features, configurations and/or additional components: a first motor and first generator, a first motor controller and a first generator controller, a master controller and power electronics, a first bleed valve and an environmental air intake and switching valve, an inter-engine gas path and mixing valve, an intercooler upstream of the means to provide power, and a power linkage between the means to provide power and the first gas turbine engine.

A further embodiment of the foregoing system, wherein the means to provide power comprises: a second gas turbine engine; a generator connected to the second gas turbine engine, and disposed to be powered by the second gas turbine engine; and a motor disposed to boost at least one of the first and second spools, and powered by the generator.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An aircraft gas turbine engine system comprising:
a first gas turbine engine comprising:
a first spool with a first compressor section;
a second spool with a second compressor section downstream of and rotationally independent from the first compressor section;
a second gas turbine engine configured to provide power to at least one of the first and second spools of the first gas turbine engine;
an inter-engine gas path disposed to receive gas flow bled from a bleed location in the first gas turbine engine downstream of the first compressor section, and to supply this gas flow to an inlet of the second gas turbine engine; and
a switch valve disposed at the inlet of the second gas turbine engine, and toggleable between two states:
an inter-engine state fluidly connecting the inter-engine gas path to an inlet of the second gas turbine engine; and
an external state fluidly disconnecting the inter-engine gas path from the inlet of the second gas turbine engine, and opening the inlet of the second gas turbine engine to an ambient air source.

2. The aircraft gas turbine engine system of claim 1, further comprising:
a generator connected to the second gas turbine engine, and disposed to be powered by the second gas turbine engine; and
a motor disposed to boost at least one of the first and second spools, and powered by the generator,
wherein providing power to at least one of the first and second spools of the first gas turbine engine comprises powering the generator to drive the motor.

3. The aircraft gas turbine engine system of claim 1, wherein the first gas turbine engine is a propulsion engine, and the second gas turbine engine is an auxiliary power unit (APU).

4. The aircraft gas turbine engine system of claim 1, further comprising an intercooler disposed along the inter-engine gas path so as to cool the gas flow, thereby supplying the gas flow to the inlet of the second gas turbine engine at a lower temperature than bled from the bleed location.

5. The aircraft gas turbine engine system of claim 1, wherein the bleed location is situated between the first compressor section and the second compressor section.

6. The aircraft gas turbine engine system of claim 1, wherein the bleed location is situated in the second compressor section.

7. The aircraft gas turbine engine system of claim 1, wherein the bleed location extends downstream from between the first compressor section and the second compressor section, and encompasses a plurality of bleed outlets from compressor regions of the first gas turbine engine.

8. The gas turbine engine system of claim 1, further comprising a linkage coupling the second gas turbine engine to the first spool of the first gas turbine engine.

9. The gas turbine engine system of claim 1, wherein power provided to the first spool from the second gas turbine engine would create an overpressure at the intersection of the first and second compressor sections, but for the gas flow bled from the bleed location.

10. The gas turbine engine system of claim 9, wherein power provided to the first spool from the second gas turbine engine exceeds power provided to the second spool from the second gas turbine engine.

11. The gas turbine engine system of claim 1, wherein the gas flow bled from the bleed location is metered.

12. The aircraft gas turbine engine system of claim 1, further comprising:
a third gas turbine engine comprising:
a third spool with a third compressor section;
a fourth spool with a fourth compressor section downstream of and rotationally independent from the third compressor section; and
a secondary inter-engine gas path disposed to receive gas flow bleed from a third engine bleed location in the third gas turbine engine downstream of the third compressor section, and to supply this gas flow to the inlet of the second gas turbine engine,
wherein the second gas turbine engine additionally provides power to at least one of the third or fourth spools.

13. The aircraft gas turbine engine system of claim 12, further comprising a mixing valve disposed upstream of the inlet of the second gas turbine engine, to receive fluid from both the inter-engine gas path and the secondary inter-engine gas path.

14. The aircraft gas turbine engine system of claim 13, further comprising an intercooler disposed between the mixing valve and the inlet of the second engine.

15. A method of operating a system of gas turbine engines including a first engine and a second engine, the method comprising:
boosting a first spool of the first engine using the second engine, thereby producing an overpressure between a first compressor on the first spool and an adjacent second compressor on a second spool of the first engine rotationally independent from and axially downstream of the first compressor;
bleeding a pressurized inter-engine airflow from the first engine, downstream of the first compressor;
supplying the pressurized inter-engine airflow to an intake of the second engine, thereby supercharging the second engine;
interrupting the supply of pressurized inter-engine airflow to the intake of the second engine; and
supplying an ambient airflow to the intake of the second engine after interrupting the supply of pressurized inter-engine airflow.

16. The method of claim 15, wherein the bleed from the first engine alleviates the overpressure sufficiently to offset the possibility of stall due to the boosting of the first spool.

17. The method of claim 16, further comprising cooling the pressurized inter-engine airflow before supplying the pressurized inter-engine airflow to the intake of the second engine.

18. The method of claim 16, wherein boosting the first spool of the first engine comprises:
driving an electrical generator with the second engine;
powering a motor from the electrical generator; and
driving the first spool using the motor.

19. An aircraft gas turbine engine system comprising:
a first gas turbine engine comprising:
a first spool with a first compressor section;
a second spool with a second compressor section downstream of and rotationally independent from the first compressor section;
a second gas turbine engine configured to provide power to at least one of the first and second spools of the first gas turbine engine;
an inter-engine gas path disposed to receive gas flow bled from a bleed location in the first gas turbine engine downstream of the first compressor section, and to supply this gas flow to an inlet of the second gas turbine engine;
a third gas turbine engine comprising:
a third spool with a third compressor section;
a fourth spool with a fourth compressor section downstream of and rotationally independent from the third compressor section; and
a secondary inter-engine gas path disposed to receive gas flow bleed from a third engine bleed location in the third gas turbine engine downstream of the third compressor section, and to supply this gas flow to the inlet of the second gas turbine engine,
wherein the second gas turbine engine additionally provides power to at least one of the third or fourth spools.

* * * * *